United States Patent [19]
Handke et al.

[11] Patent Number: 5,685,400
[45] Date of Patent: Nov. 11, 1997

[54] HYDRAULIC ADJUSTABLE SHOCK ABSORBER FOR A MOTOR VEHICLE

[75] Inventors: Günther Handke, Euerbach, Germany; Klaus Beyfuss, Florence, Ky.; Carlos Prudente, Birmingham, Mich.; Henning Rittstieg, Yilla Hills, Ky.; Rolf Wengenroth, Harrison Township, Mich.

[73] Assignee: Fichtel & Sachs AG, Schweinfurt, Germany

[21] Appl. No.: 410,797

[22] Filed: Mar. 27, 1995

[30] Foreign Application Priority Data

Mar. 26, 1994 [DE] Germany ............... 44 10 522.3

[51] Int. Cl.[6] .................................... F16F 9/46
[52] U.S. Cl. ...................... 188/299; 188/322.19
[58] Field of Search ...................... 188/299, 315, 188/318, 322.19

[56] References Cited

U.S. PATENT DOCUMENTS 5,449,055  9/1995  Geiling et al. ............... 188/299

FOREIGN PATENT DOCUMENTS

| | | |
|---|---|---|
| 3434877 | 4/1986 | Germany. |
| 4007180 | 9/1991 | Germany. |
| 4114307 | 11/1992 | Germany. |
| 4130870 | 3/1993 | Germany. |
| 91/10077 | 7/1991 | WIPO ............ 188/299 |

Primary Examiner—Peter M. Poon
Attorney, Agent, or Firm—Nils H. Ljungman and Associates

[57] ABSTRACT

Hydraulic, adjustable shock absorber with a working cylinder and a piston which is fastened to a piston rod and divides the working cylinder into two working chambers, with an equalization chamber located in a jacket tube surrounding the working cylinder, which equalization chamber is connected by means of at least one controllable valve and a bypass channel running inside the jacket tube to one of the working chambers, whereby at least one valve is connected to the shock absorber by means of an opening of a collar of the jacket tube, characterized by the fact that located inside the collar is a pipe socket of the valve which is connected to the collar by means of a seam.

20 Claims, 12 Drawing Sheets

HYDRAULIC ADJUSTABLE SHOCK ABSORBER FOR A MOTOR VEHICLE

BACKGROUND OF THE INVENTION

1. Field of the Invention

The present invention generally relates to a hydraulic, adjustable shock absorber with a working cylinder and a piston which is fastened to a piston rod and divides the working cylinder into two working chambers, with an equalization chamber located in a jacket tube surrounding the working cylinder. The equalization chamber is connected by means of at least one controllable valve and a bypass channel running inside the jacket tube to one of the working chambers, whereby at least one valve is connected to the shock absorber by means of an opening of a collar of the jacket tube.

2. Background Information

A shock absorber such as that described above is disclosed, for example, in German Patent Application No. 34 34 877. One disadvantage of such a shock absorber is associated with the connection of the valve to the jacket tube of the shock absorber, since the weld seam between the jacket tube and the pipe socket is curved in three dimensions. It can be very complex and expensive to have this weld seam laid down by a welding robot. Moreover, the pipe socket must be generally executed with a curved end surface toward the jacket tube, and this end surface is usually very difficult to realize with the required accuracy.

One solution to this problem is disclosed in DE 40 07 180, in which a collar is formed on the jacket tube, and is connected to the controllable valve by means of an opening.

German Laid Open Patent Application No. 41 14 307.8 also discloses a jacket tube with jacket surfaces which form a dome, which makes a transition into a plane connection surface. On account of the KES welding process used, the dome must be generally realized in a very accurate manner, since air spaces will otherwise result. Such air spaces can have an extremely negative impact on the quality of the weld seam.

The KES welding process may be generally well-known in the Federal Republic of Germany and is therefore not discussed in further detail herein.

OBJECT OF THE INVENTION

An object of the present invention is to create a connection which is simple to realize, in terms of fabrication technology, between a controllable valve and a jacket tube, in which a screwed connection can be eliminated.

SUMMARY OF THE INVENTION

The present invention teaches that the above object can be achieved by providing, inside the collar, a pipe socket of the valve which is connected to the collar by means of at least one weld seam. An advantageous weld seam is a flat weld, which can be realized by any simple welding robot. Consequently, there is essentially no reason to fear distortion caused by the heat of welding, since the collar surrounds the pipe socket.

To reduce the effort and expense required for deformation, shaping, or forming, the collar of the jacket tube preferably has a minimal height, at which the end surface of the collar preferably lies in a plane with the outside diameter of the jacket tube. The shorter the collar, the easier it is to deform or shape the collar, because the material for the collar is preferably "extracted" from the jacket tube.

For a further simplification of the manufacturing process, the invention teaches that the pipe socket of the valve can be welded as a pre-fabricated part into the opening of the collar. There is essentially no need to clamp the shock absorber with the pipe socket in a processing machine.

The pipe socket can advantageously include a portion of its length which preferably has a constant outside diameter essentially equal to the diameter of the opening of the collar. The pipe socket can thereby be shifted axially, within limits, in its welded-in position, so that an adaptation to the dimensions of the working cylinder can be achieved. The end surface of the collar can thereby serve as the connection surface for the weld seam. Thereby the end surface can allow very wide tolerances, essentially without adversely affecting the quality of the weld seam.

In one variant embodiment, the pipe socket can have a contact surface which can preferably be supported on the end surface of the collar. According to an additional advantageous feature, the contact surface of the pipe socket can be formed by a shoulder, the axial surface of which shoulder can represent a centering collar. During the assembly process, the pipe socket can preferably be inserted into the collar, whereby the pipe socket can essentially be self-centering and can assume the specified axial position.

It should be understood that when the word "invention" is used in this application, the word "invention" includes "inventions", that is, the plural of "invention". By stating "invention", applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, with respect to one another.

One aspect of the invention resides broadly in a shock absorber comprising a cylinder which defines a chamber therein. The chamber contains a damping fluid. A piston rod sealingly projects into the cylinder and is axially displaceable with respect to the cylinder. A piston being attached to the piston rod which piston is slidably disposed within the cylinder to sealingly divide the chamber into first and second chambers. Apparatus for permitting fluid communication between the first and second chambers which apparatus for permitting fluid communication comprises a valve device which valve device has a first aperture and a second aperture. The valve device being configured for permitting fluid flow between the first aperture and the second aperture. The valve device comprising a collar which collar being disposed on and projecting from the cylinder. The collar having an inner surface and an outer surface. Each collar inner and outer surface being configured in the form of a circular cylinder. The collar inner surface being disposed at least partially within the collar outer surface. A connecting element having an inner surface and an outer surface. Each connecting element inner and outer surface being configured in the form of a circular cylinder. The collar inner surface being disposed at least partially within the connecting element outer surface. The collar inner surface for receiving and supporting the connecting element. The connecting element outer surface in contact with the inner surface of the collar. A valve being connected to the collar by the connecting element. At least one of the apertures in contact with the collar for permitting flow of fluid between the apertures and the collar. The valve for permitting flow of fluid in the collar and an apparatus for connecting the connecting element to the collar.

Another aspect of the invention resides broadly in a method of manufacturing a shock absorber for a motor vehicle. The shock absorber comprising a cylinder which cylinder comprises a substantial portion of the outer surface of the shock absorber; The cylinder defining a chamber therein which chamber contains a damping fluid. A piston rod sealingly projecting into the cylinder and being axially displaceable with respect to said cylinder and a piston being attached to the piston rod which piston is slidably disposed within the cylinder to sealingly divide the chamber into first and second chambers. An apparatus for permitting fluid communication between the first and second chambers. The apparatus for permitting fluid communication comprising a valve apparatus which valve apparatus has a first aperture and a second aperture. The valve apparatus being configured for permitting fluid flow between the first aperture and said the second aperture. The method comprising the steps of: providing a cylinder comprising a substantial portion of the outer surface of said shock absorber; the cylinder defining a chamber therein, the chamber containing a damping fluid; providing a piston rod sealingly projecting into the cylinder and being axially displaceable with respect to the cylinder; providing a piston being attached to the piston rod, the piston being slidably disposed within the cylinder to sealingly divide the chamber into first and second chambers; providing an apparatus for permitting fluid communication between the first and second chambers; providing a valve for permitting fluid communication between a first aperture and a second aperture. Providing a collar which collar has an inner surface and an outer surface; providing a connecting element having an inner surface and an outer surface; providing a valve which valve is for permitting flow of fluid in the collar; and providing an apparatus for connecting the connecting element to the collar; the method further comprising the steps of: disposing a piston rod to sealingly project into the cylinder and disposing the piston rod to be axially displaceable with respect to the cylinder; attaching a piston to the piston rod; disposing the piston within the cylinder to sealingly divide the chamber into first and second chambers; connecting the valve means for permitting fluid flow between the first aperture and the second aperture. Forming the collar on the cylinder; disposing the connecting element outer surface at least partially within the collar inner surface; connecting the valve to the connecting element; connecting the valve to the collar; connecting at least one of: the first aperture and the second aperture to the collar for permitting flow of fluid between the aperture and the collar; and connecting the connecting element to the collar.

BRIEF DESCRIPTION OF THE DRAWINGS

The invention and its advantages are explained in greater detail below, with reference to the accompanying figures, in which.

DESCRIPTION OF THE PREFERRED EMBODIMENT

Figure 1:
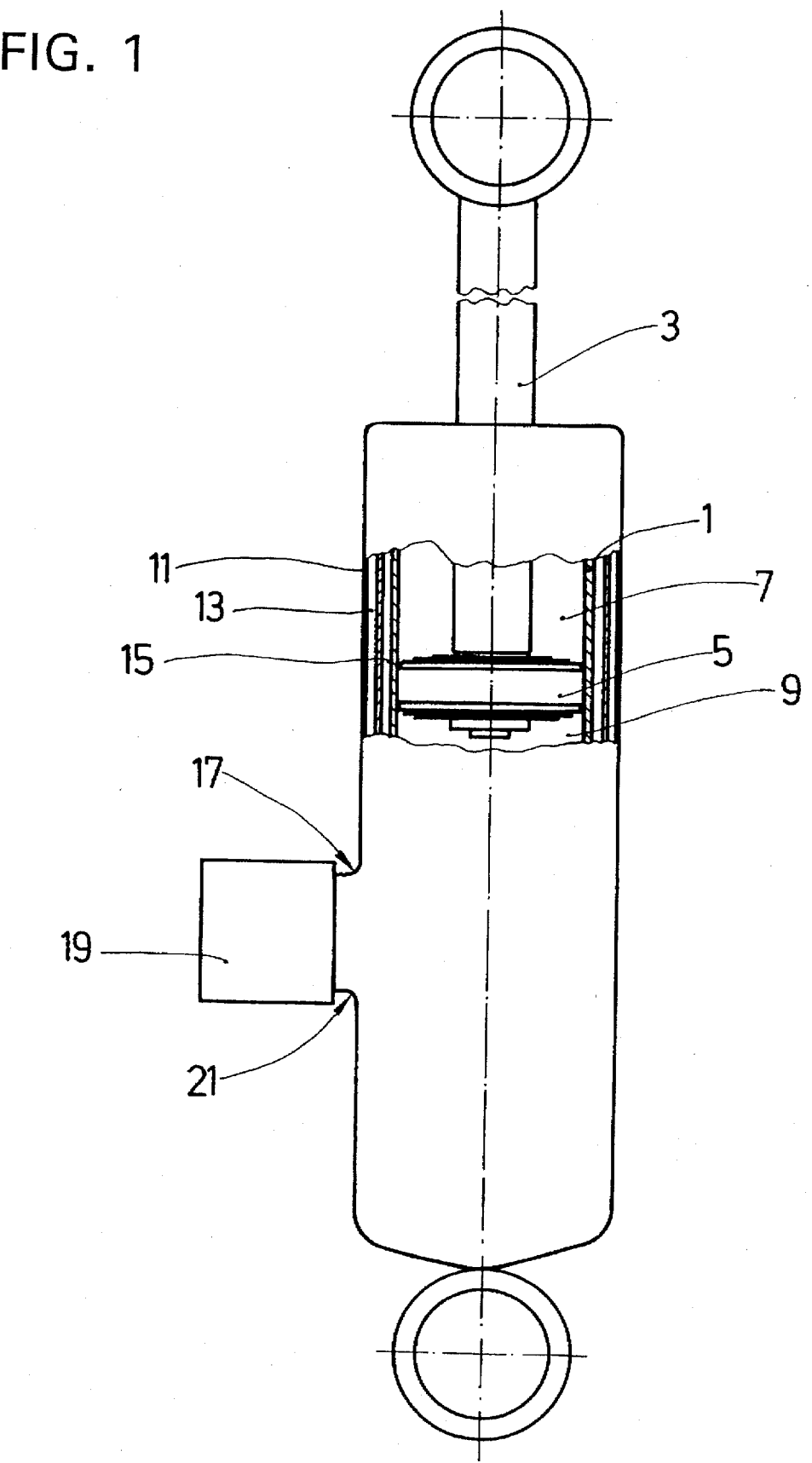
FIG. 1 shows an overall view of a shock absorber.

The shock absorber illustrated in FIG. 1 includes a working cylinder 1, which working cylinder 1 preferably includes a piston rod 3 with a piston 5 fastened to piston rod 3. The piston 5 can divide the working cylinder 1 into an upper and a lower working chamber 7 and 9, respectively. The working cylinder 1 is preferably surrounded by a jacket tube 11, whereby the equalization chamber 13 formed between the working cylinder 1 and the jacket tube 11 can preferably be connected to the lower working chamber 9 by means of a bottom valve (not shown).

A bypass connection 15 can be used to carry the flow of damping medium to an adjustable valve 17. The valve 17 can thereby be housed in a separate component 19 and can preferably be connected to the shock absorber by means of a collar 21 of the jacket tube 11.

Figure 2:
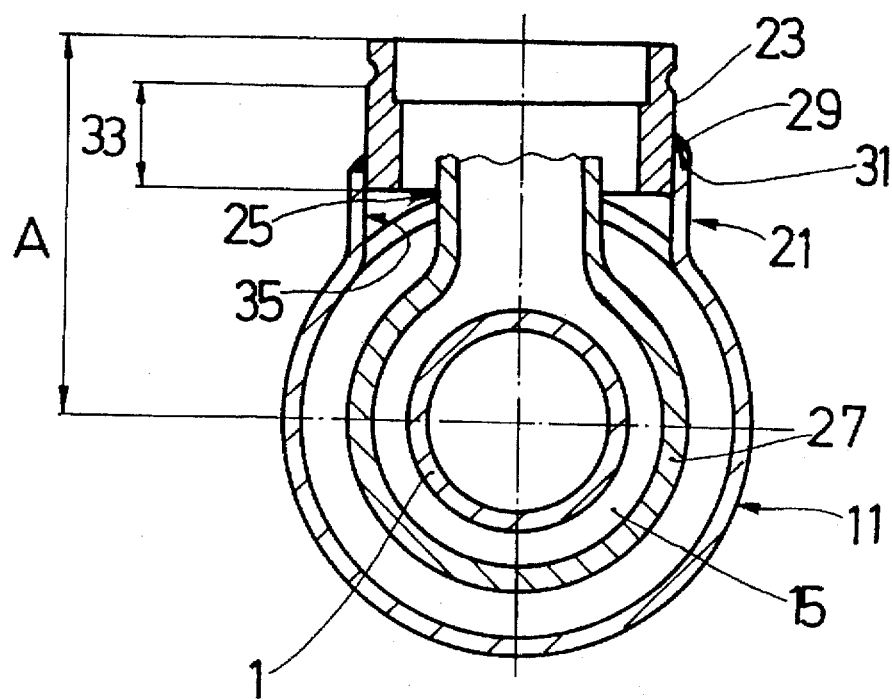
FIGS. 2-4 are cross sections through the jacket tube.
Figure 3:
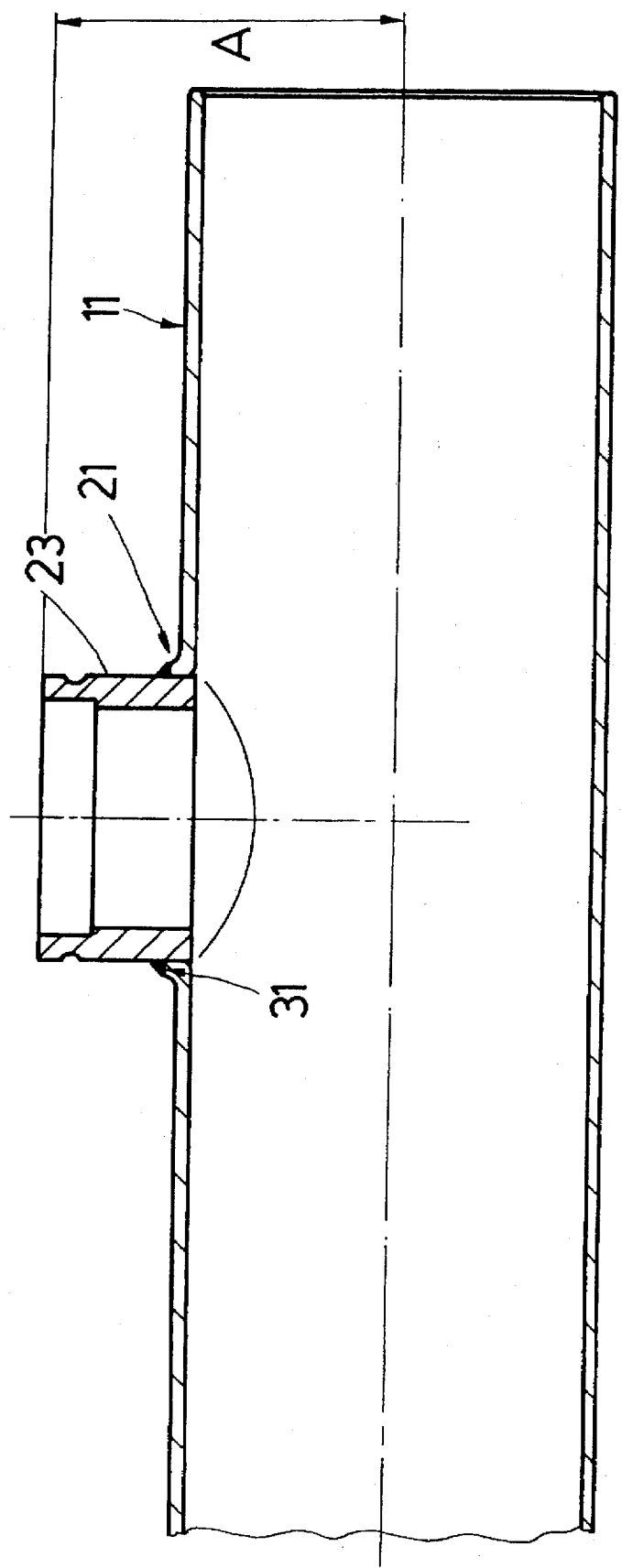
Figure 5:
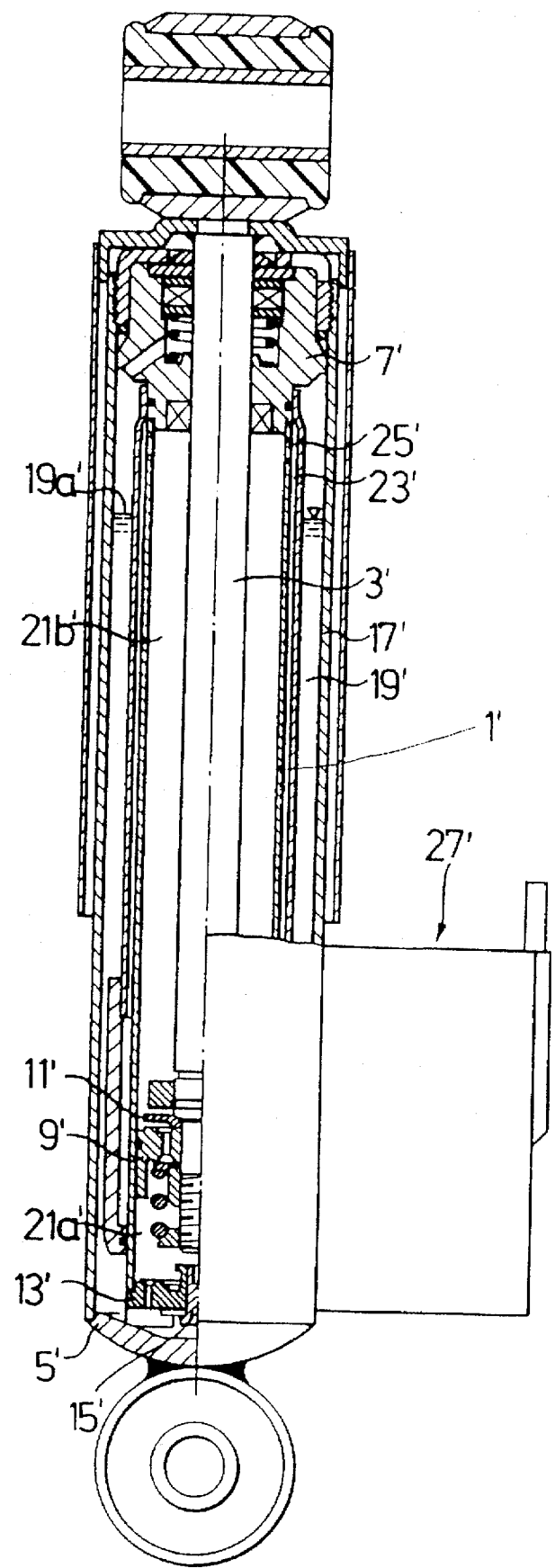
Figure 6:
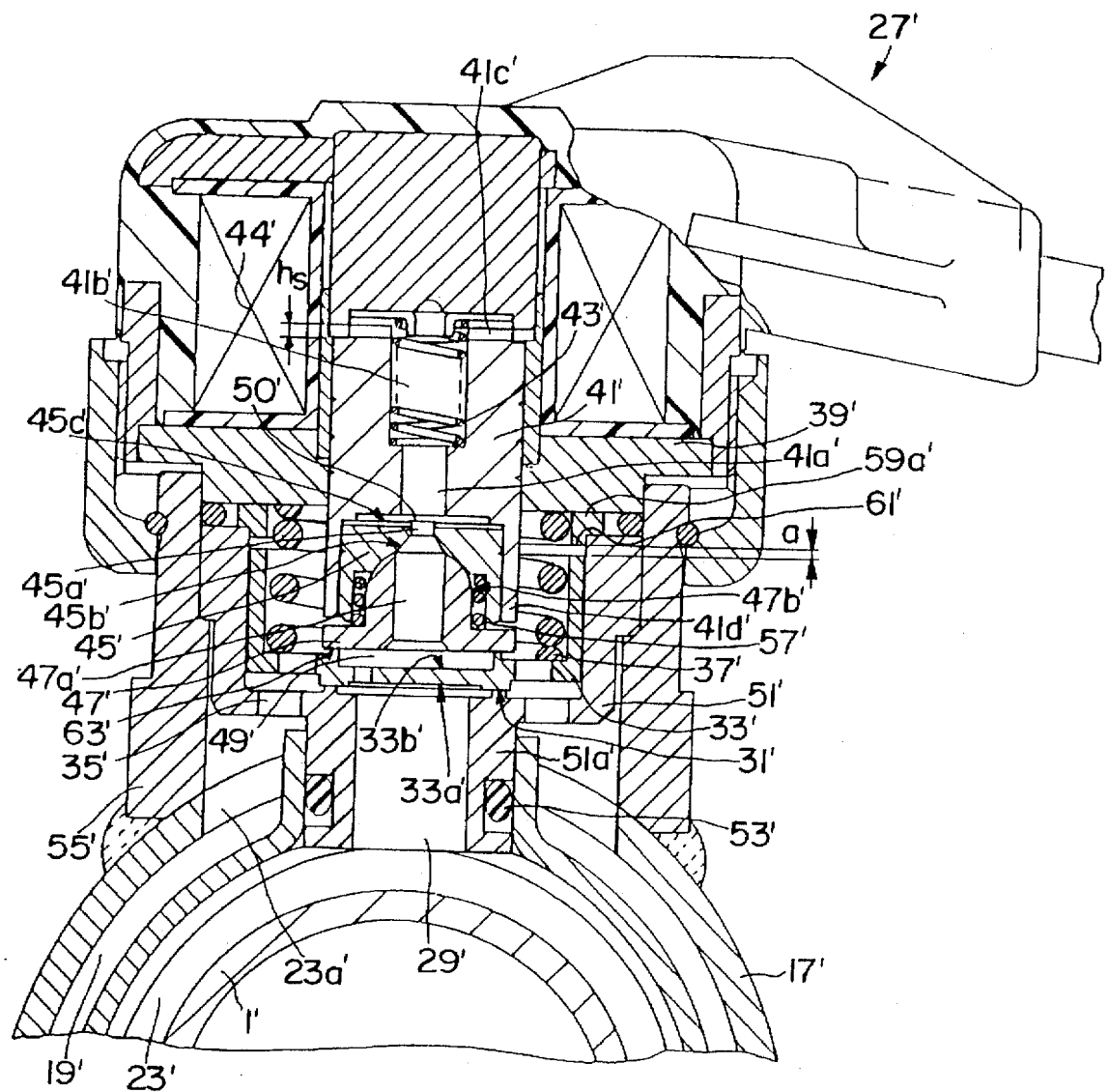
Figure 7:
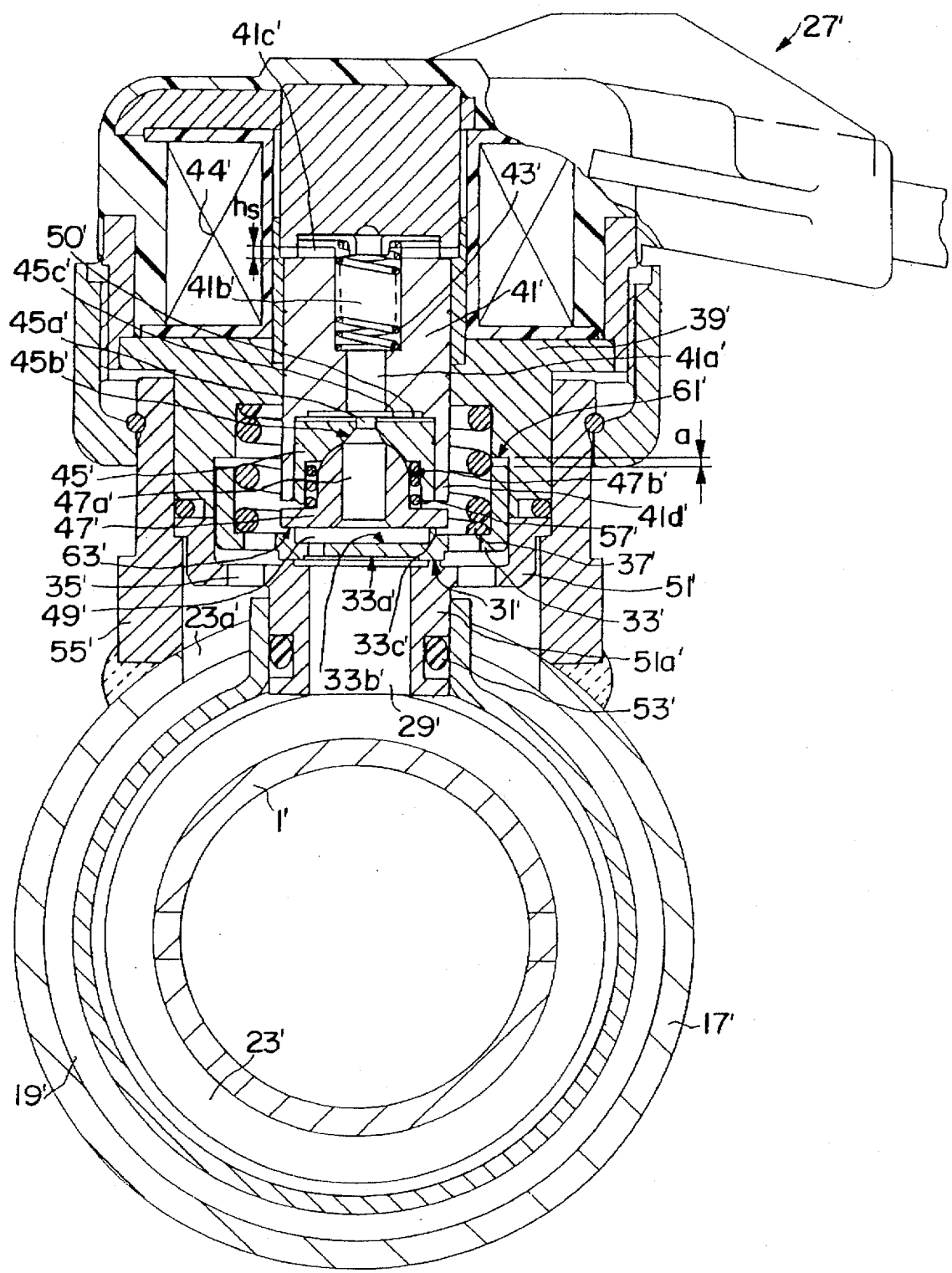
Figure 8:
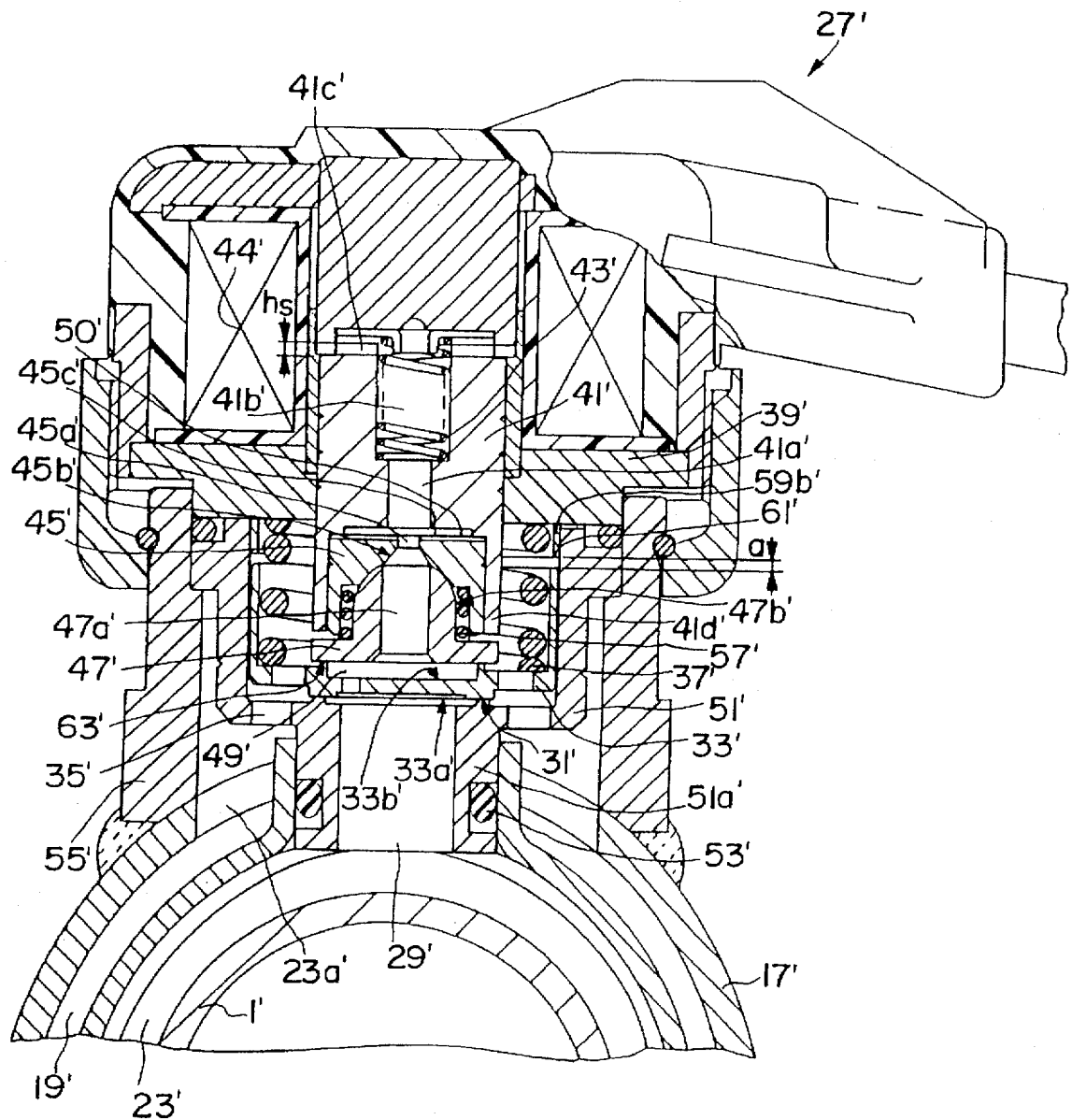
Figure 9:
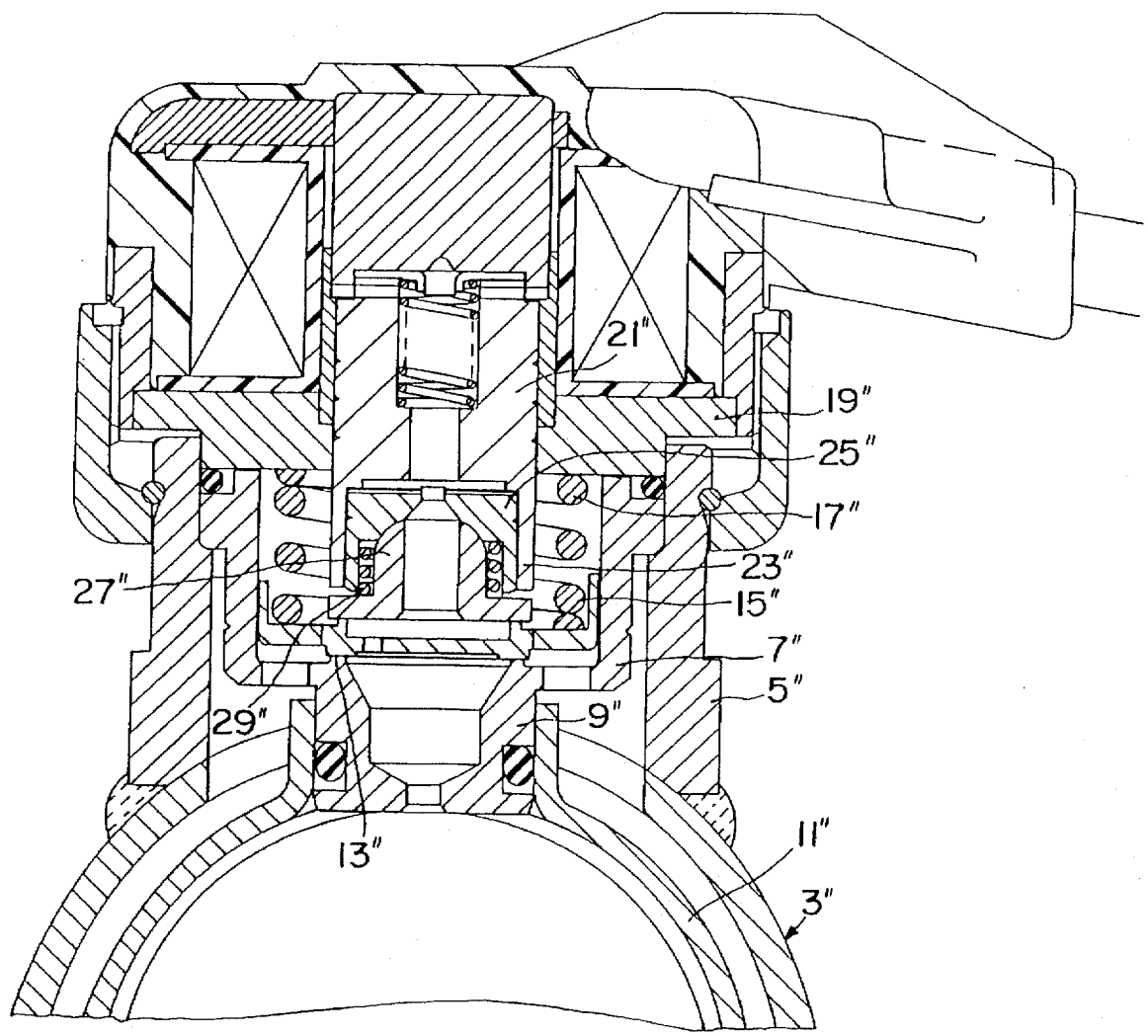
Figure 9A:
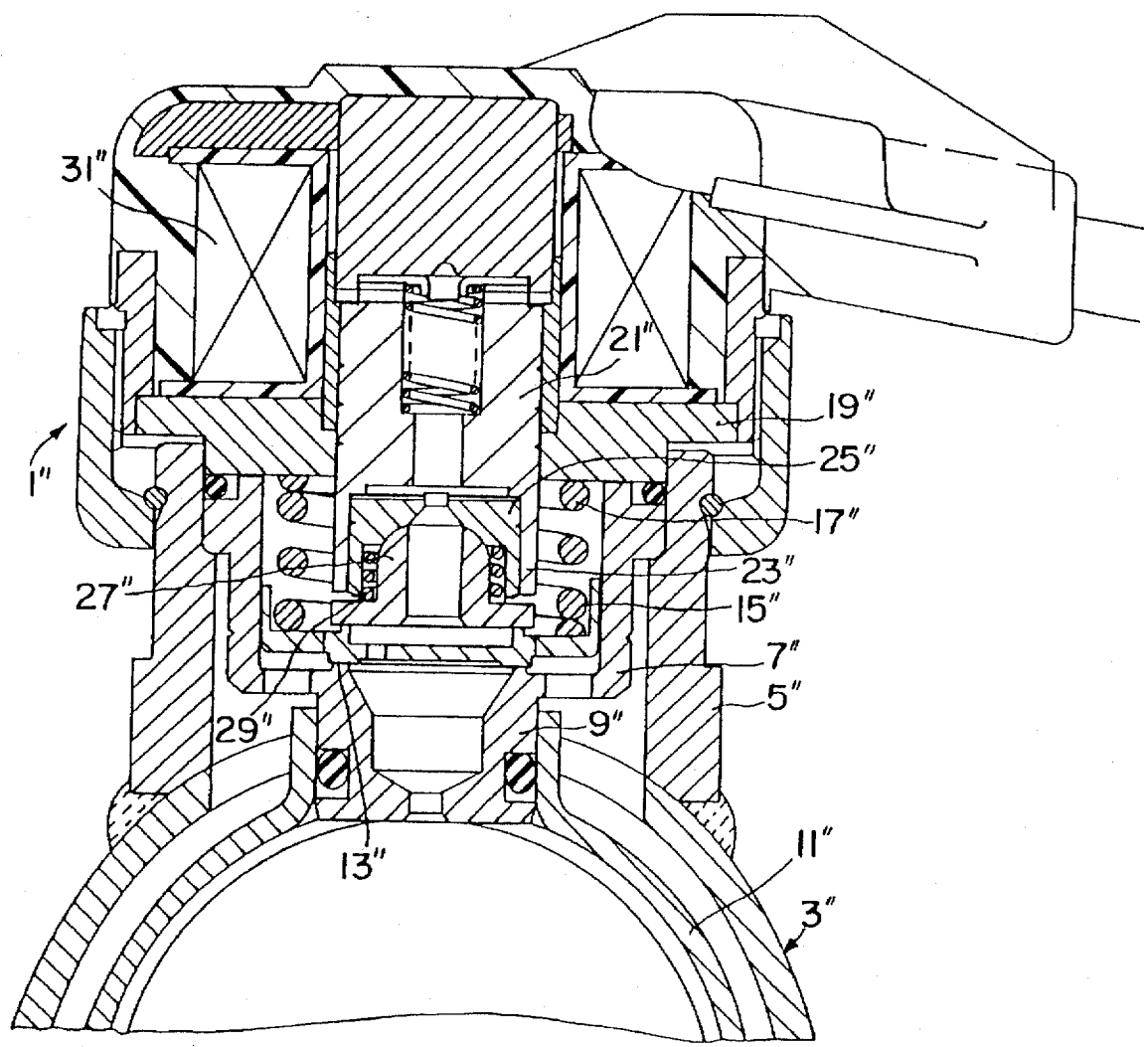
Figure 10:
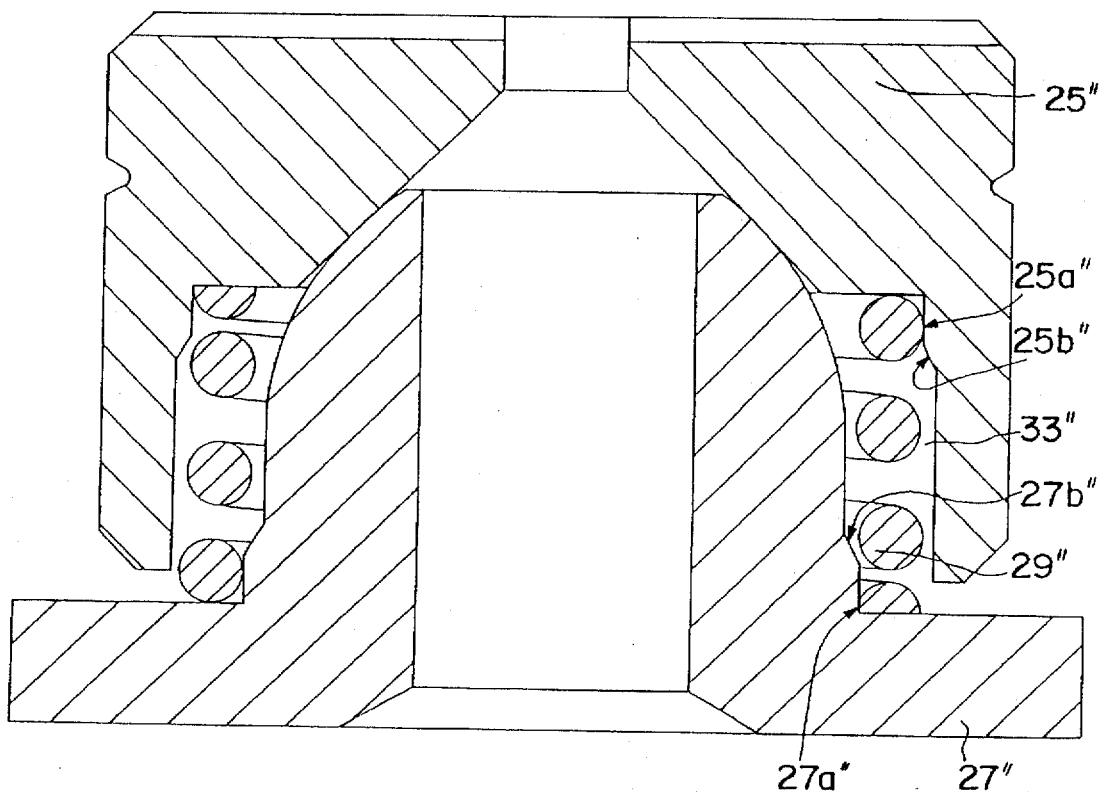
Figure 11:
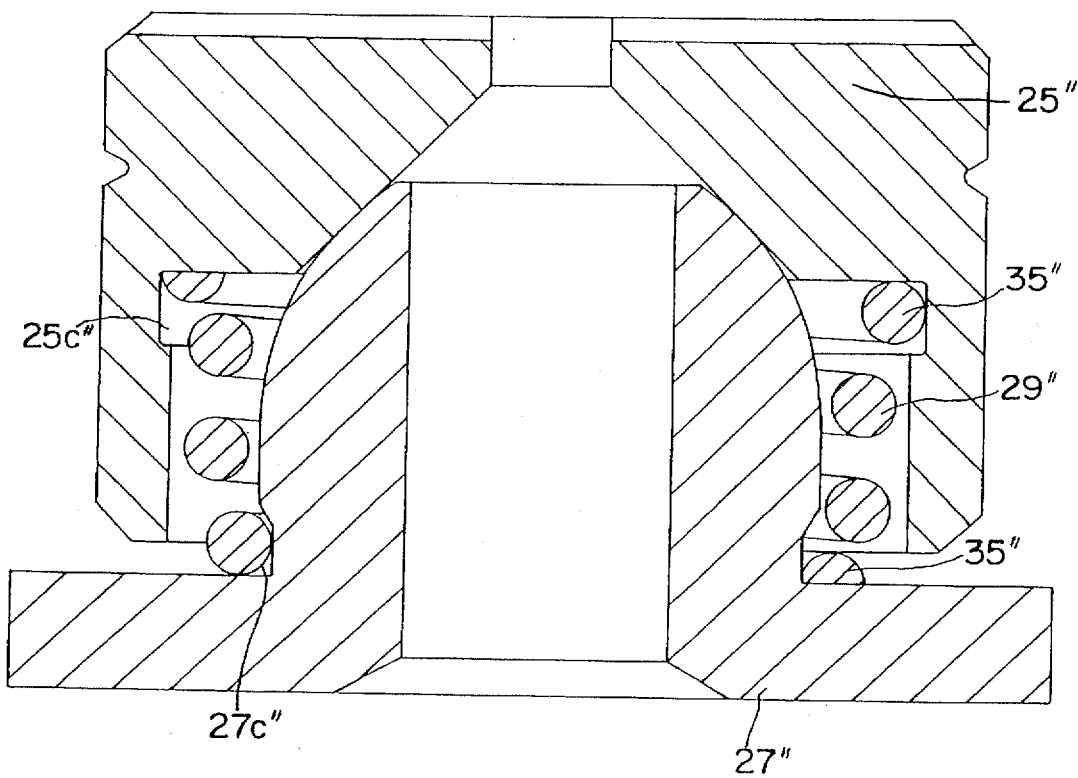
Figure 12:
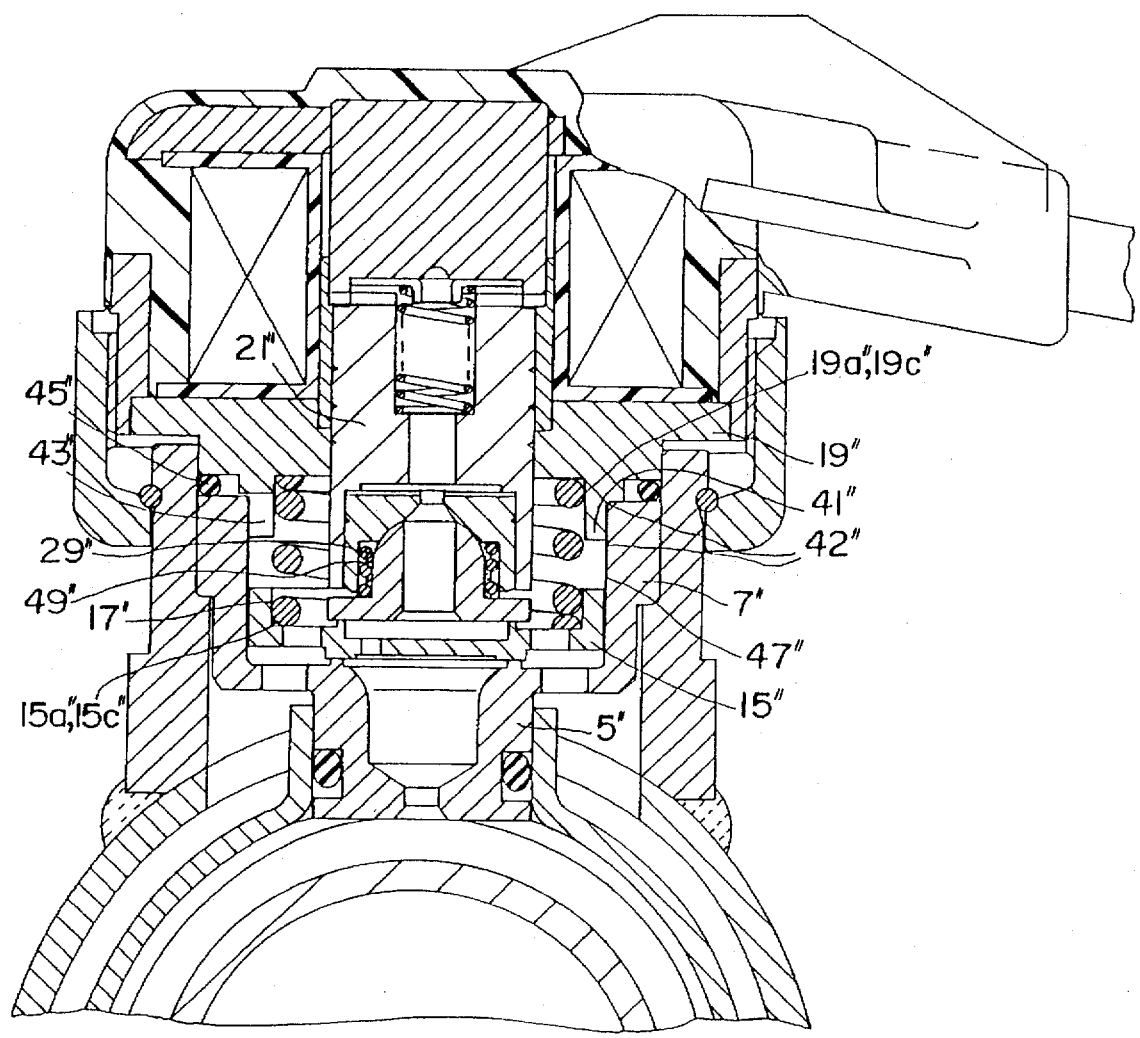
Figure 12A:
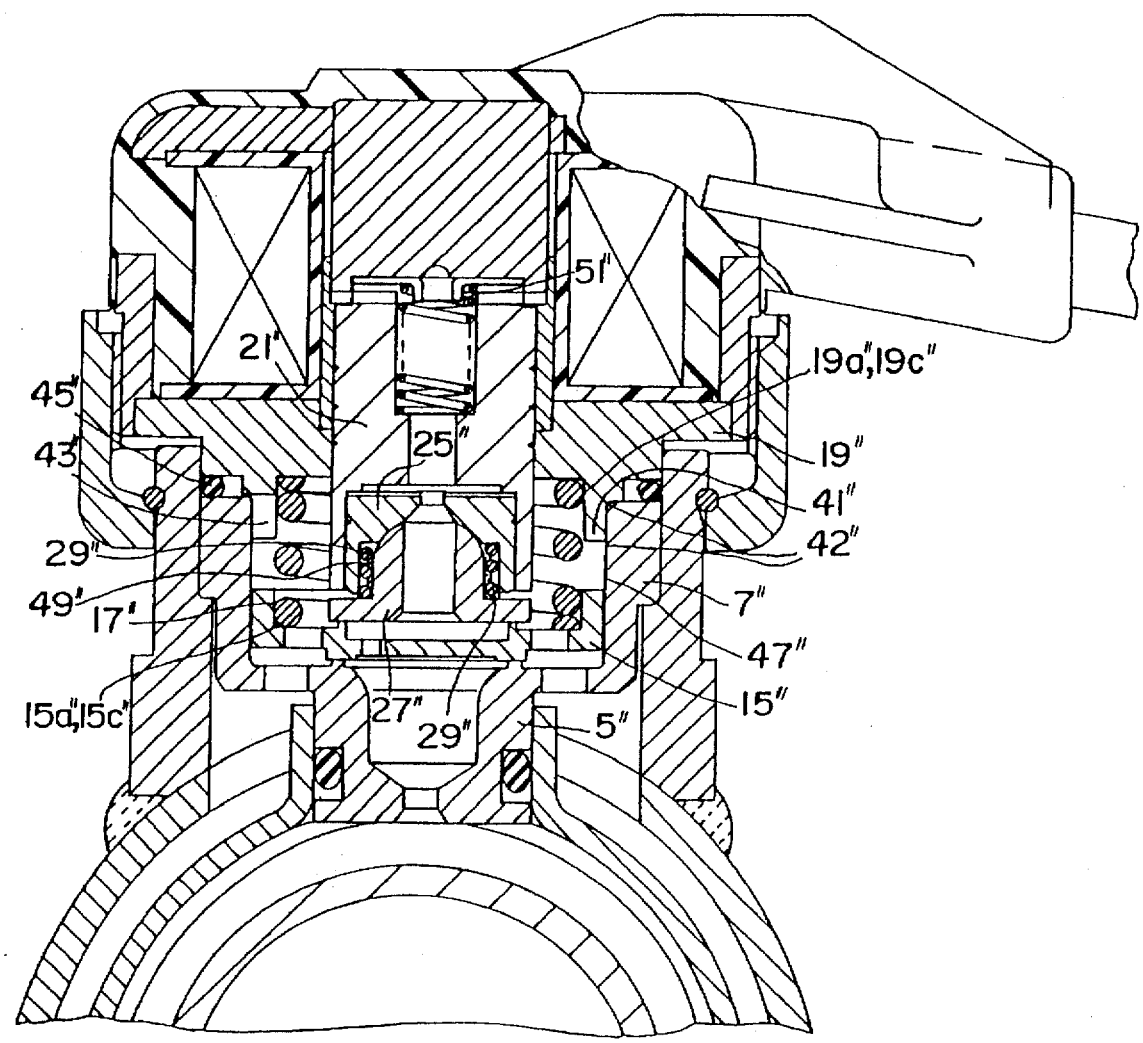

FIGS. 2 and 3 show the jacket tube 11 with its collar 21, in accordance with a preferred embodiment of the present invention. A pipe socket 23 which is prefabricated can preferably be inserted into the collar 21 during assembly, until it reaches a level A. This level A is essentially a function of the height of a transmission or transfer socket 25 of the intermediate pipe 27, which can essentially form the bypass connection 15 to the working cylinder 1. Generally, the smaller the diameter of the working cylinder 1, the smaller the intermediate pipe 27, although the height of the transmission or transfer socket 25 of the cylinder tube 27 may not essentially be selected arbitrarily, since the material for the sockets can preferably be extracted from the intermediate pipe.

It will be appreciated that the aforementioned height dimension "A" can essentially represent the straight-line distance, as measured in a direction parallel to the central longitudinal axis of pipe socket 23, between that end of pipe socket 23 facing away from tube 11 and what may be considered the common central longitudingal axis of working cylinder 1, intermediate pipe 27, and jacket tube 11.

In an embodiment of the present invention, the collar 21 can preferably be formed on a part of the jacket tube 11 by means of extruding, pressing, stamping, or forging.

The welding can then preferably be performed by means of a fillet weld 29 between one end surface 31 of the collar 21 and the pipe socket 23. The end surface 31 can be substantially relatively flat, although the flatness does not essentially have any effect on the quality of the weld joint. Modern welding robots can essentially easily compensate for any uneven spots such as may be caused, for example, by the juncture between such a flat end surface 31 and pipe socket 23. In accordance with a preferred embodiment of the present invention, the specified welding process can be inert gas shielded welding. Very little effort is essentially required for shaping, in particular for the calibration or sizing of the collar. It is essentially more important that there be no three-dimensional curve which must be followed by the welding robot. Distortion caused by the heat of the welding process can thereby be eliminated because the collar 21 can surround the pipe socket 23, so that the pipe socket, when heated by the weld seam 29, can preferably have no degree of freedom in the radial direction.

In an embodiment of the invention, as an alternative, the pipe socket 23 may be connected to the collar 21 by means of brazing, crimping, or adhesion by applying super glues or epoxies, for example.

The height of the collar 21, as shown in FIG. 3, can preferably be just low enough so that the end surface 31 of the collar 21 can lie in a plane with the outside diameter of the jacket tube 11. As a result, the force required for shaping can essentially remain low, and there can essentially be no reductions in wall thickness which would result from the drawing or shaping of the collar. As a result of the setting of the height A (See FIG. 2), by means of a device not shown, the pipe socket 23 can be adapted to different working cylinders 1. For that purpose, the pipe socket 23, over a longitudinal portion 33, can preferably have an outside diameter which equals the diameter of the opening 35 of the collar 21.

In other words, in accordance with a preferred embodiment of the present invention, a lower longitudinal portion 33 of pipe socket 23 may have an outer diameter essentially the same as the inner diameter of opening 35 of collar 21. In this manner, it is conceivable that pipe socket 23 will be incorporable into a variety of different collars 21 of differing axial length, and to varying degrees of insertion, as allowed by the axial length of the longitudinal section 33.

Various media for adequately presetting the aforementioned height "A" will be well-known to those of ordinary skill in the art and will thus not be further described herein.

Figure 4:
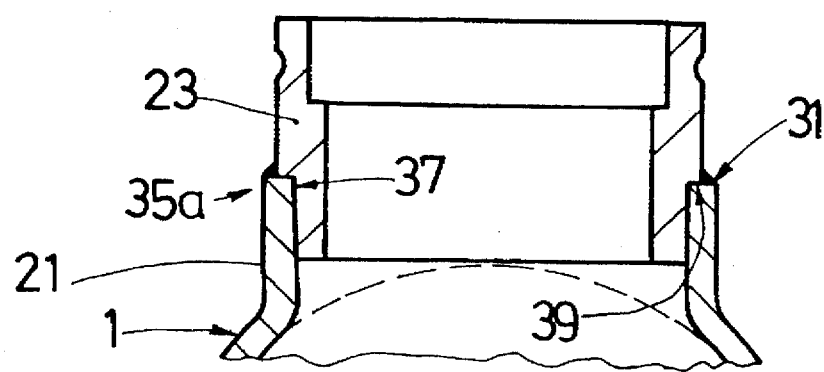

The embodiment illustrated in FIG. 4 is essentially the same as the variants illustrated in FIGS. 2 and 3. One difference is that the pipe socket 23 has a shoulder 35a which can preferably form an axial centering surface 37 and a radial contact surface 39 of the pipe socket 23 in relation to the collar 21. There would then essentially be no need for an adjustment device for the height A. An additional advantage is that there can preferably be a flat, very simple welding point in the form of the end surface 31 of the collar 21.

Thus, in accordance with a preferred embodiment of the present invention, as shown in FIG. 4, pipe socket 23 may include a shoulder, generally inserted at 35a, comprising an axial centering surface 37 and a radial contact surface 39. Since the axial centering surface 37 and a radial contact surface 39 would essentially dictate the ultimate position of pipe socket 23 with respect to collar 21, with the radial contact surface 39 essentially being interfaced with the end surface of collar 21, there would essentially be no need for any external media for the purpose of presetting the aforementioned height "A" (see FIG. 2).

One feature of the invention resides broadly in the hydraulic adjustable shock absorber with a working cylinder and piston which is fastened to a piston rod and divides the working cylinder into two working chambers, with an equalization chamber located in a jacket tube surrounding the working cylinder, which equalization chamber is connected by means of at least one controllable valve and a bypass channel running inside the jacket tube to one of the working chambers, whereby at least one valve is connected by means of an opening of a collar of the jacket tube with the shock absorber, characterized by the fact that inside the collar 21 there is a pipe socket 23 of the valve (17), which is connected by means of at least one weld seam to the collar 21.

Another feature of the invention resides broadly in the hydraulic shock absorber characterized by the fact that the collar 21 of the jacket tube 1 has a minimal height, at which the end surface 31 of the collar 21 lies in a plane with the outside diameter of the jacket tube 1.

Yet another feature of the invention resides broadly in the hydraulic shock absorber characterized by the fact that the pipe socket 23 of the valve 17 is welded as a prefabricated part into the opening of the collar 21.

Still another feature of the invention resides broadly in the hydraulic shock absorber characterized by the fact that the pipe socket 23 has a longitudinal area 33 with a constant outside diameter, which is essentially equal to the diameter of the opening 35 of the collar 21.

A further feature of the invention resides broadly in the hydraulic shock absorber characterized by the fact that the pipe socket 23 has a contact surface 39 which is supported against the end surface 31 of the collar 21.

Another feature of the invention resides broadly in the hydraulic shock absorber characterized by the fact that the contact surface 39 of the pipe socket 23 is formed by a shoulder 35, the axial surface 37 of which represents a centering collar.

Examples of check valve arrangements, and components associated therewith, which may be utilized in accordance with the embodiments of the present invention, may be found in the following U.S. Pat.: No. 5,078,240, which issued to Ackermann et al. on Jan. 7, 1992; No. 4,482,036, which issued to Wossner et al. on Nov. 13, 1984; No. 4,287,970, which issued to Eusemann et al. on Sep. 8, 1981; and No. 4,105,041, which issued to Axthammer on Aug. 8, 1978.

Examples of electromagnetic valve arrangements with armatures, and associated components, which may be utilized in accordance with the embodiments of the present invention, may be found in the following U.S. Pat.: No. 5,265,703, which issued to Ackermann on Nov. 30, 1993; No. 5,180,039, which issued to Axthammer et al. on Jan. 19, 1993; No. 4,899,996, which issued to Maassen et al. on Feb. 13, 1990; No. 4,850,460, which issued to Knecht et al. on Jul. 25, 1989; and No. 4,785,920, which issued to Knecht et al. on Nov. 22, 1988.

Examples of shock absorbers, and components associated therewith, which may be utilized in accordance with the embodiments of the present invention, may be found in the U.S. patents listed above.

The appended drawings in their entirety, including all dimensions, proportions and/or shapes in at least one embodiment of the invention, are accurate and to scale and are hereby included by reference into this specification.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 10 522.3, filed on Mar. 26, 1994, having inventors Gunther Handke, Klaus Beyfuss, Carlos Prudente, Henning Rittstieg, and Rolf Wengenroth, and DE-OS P 44 10 522.3 and DE-PS P 44 10 522.3, are hereby incorporated by reference as if set forth in their entirety herein.

The invention as described hereinabove In the context of the preferred embodiments is not to be taken as limited to all of the provided details thereof, since modifications and variations thereof may be made without departing from the spirit and scope of the invention.

What is claimed is:

1. A shock absorber comprising:

a cylinder;

said cylinder having a longitudinal axis;

said shock absorber comprising an outer surface;

said cylinder comprising a substantial portion of the outer surface of said shock absorber;

said cylinder defining a chamber therein, said chamber containing a damping fluid;

a piston rod sealingly projecting into said cylinder and being axially displaceable with respect to said cylinder;

a piston being attached to said piston rod, said piston being slidably disposed within said cylinder to sealingly divide said chamber into first and second chambers;

means for permitting fluid communication between said first and second chambers;

said means for permitting fluid communication comprising valve means, said valve means having first aperture means and second aperture means, said valve means being configured for permitting fluid flow between said first aperture means and said second aperture means;

said valve means comprising:
  a valve;
  a collar;
  said collar having a longitudinal axis;
  said collar being disposed on, and projecting from, said cylinder;
said longitudinal axis of said cylinder being disposed substantially transverse to said longitudinal axis of said collar;
said collar having an inner surface and an outer surface;
said collar having a first end and a second end;
said first end of said collar being disposed adjacent said cylinder;
each of said inner surface and said outer surface of said collar being substantially cylindrical;
said inner surface of said collar being disposed at least partially within said outer surface of said collar;
a connecting element;
said connecting element having an inner surface and an outer surface;
each of said inner surface and said outer surface of said connecting element being substantially cylindrical;
a portion of said inner surface of said collar being disposed about said outer surface of said connecting element;
said inner surface of said collar for receiving and supporting said connecting element;
said outer surface of said connecting element being in contact with said inner surface of said collar;
said valve being connected to said collar by said connecting element;
at least one of said first aperture means and said second aperture means being disposed in contact with said collar for permitting flow of fluid between one of said first and second aperture means and said collar;
said valve for controlling flow of fluid in said collar;
a weld for connecting said connecting element to said collar;
said weld being disposed at said second end of said collar;
said outer surface of said connecting element comprising:
  a first portion disposed immediately adjacent said weld;
  a second portion extending from said first portion of said connecting element towards said cylinder;
said first portion of said connecting element having a diameter, said diameter being defined substantially perpendicular to said longitudinal axis of said collar;
said second portion of said connecting element having a diameter, said diameter being disposed substantially perpendicular to said longitudinal axis of said collar; and
said diameters of said first and second portions of said connecting element being substantially equal.

2. The shock absorber according to claim 1, wherein:
said cylinder comprises an equalization chamber, said equalization chamber being disposed in said cylinder;
said equalization chamber comprises means for permitting flow of fluid between said equalization chamber and one of said first and second chambers;
said means for permitting flow of fluid between said equalization chamber and said at least one chamber comprises: at least said valve and a bypass channel.

3. The shock absorber according to claim 2, wherein:
said connecting element comprises a circular and cylindrical shape;
said inner surface of said connecting element defines an inner area of said connecting element;
said inner area of said connecting element comprises an aperture;
said connecting element comprises a first shoulder;
said first shoulder being disposed at least partially within said connecting element aperture;
said first shoulder of said connecting element for connecting said valve to said collar;
said connecting element and said valve together comprise a prefabricated part, said prefabricated part for being disposed in said collar as a unit during manufacture; and
said unit comprises said connecting element and said valve being welded as a prefabricated part to said collar.

4. The shock absorber according to claim 3, wherein:
said cylinder of said shock absorber comprises an outer wall;
said outer wall of said cylinder comprises a portion;
said outer wall portion of said cylinder comprises at least one of: an extrusion, a pressing, an extraction, a forging, and a stamping;
said outer wall portion of said cylinder comprises said collar;
said collar is an extension of said outer wall portion of said cylinder;
said collar is substantially in the form of a circular and cylindrical shape;
said inner surface of said collar defines an inner area of said collar;
said inner area of said collar comprises an aperture, said collar aperture for receiving said connecting element;
said aperture of said inner area of said collar abuts each of said first and second aperture means;
said second end of said collar is disposed opposite said first end and extends away from said cylinder;
said second end of said collar comprises an end surface;
said end surface of said second end of said collar connects said inner and outer surfaces of said collar to one another; and
said end surface of said second end of said collar and said inner surface of said collar at least partially abut said outer surface of said connecting element;
a portion of said outer surface of said connecting element is disposed substantially adjacent to and in contact with said end surface of said second end of said collar;
said end surface of said second end of said collar and said portion of said outer surface of said connecting element comprise said at least one weld seam;
said at least one weld seam connects said connecting element to said collar;
said end surface of said second end of said collar is disposed away from said cylinder; and
said end surface of said second end of said collar defines a plane, said plane being disposed tangentially with respect to a portion of said outer wall of said cylinder.

5. The shock absorber according to claim 4, wherein:

said connecting element has a longitudinal axis;

said longitudinal axis of said connecting element defines an axial direction parallel to the longitudinal axis of said collar;

said connecting element comprises a first end and a second end;

said second end of said connecting element is disposed at a substantial axial distance from said first end of said connecting element;

said first end of said connecting element is disposed substantially adjacent said collar;

said connecting element comprises a portion disposed between said first end and said second end of said connecting element;

said portion of said connecting element has a length parallel to the longitudinal axis of said connecting element;

said aperture of said collar has an inside diameter;

said connecting element has a portion, said portion of said connecting element has an outside diameter;

said outside diameter of said portion of said connecting element is disposed perpendicular to said longitudinal axis of said collar;

said outside diameter of said portion of said connecting element is substantially continuous along at least a portion of said longitudinal axis of said collar;

said outside diameter of said portion of said connecting element is substantially equal to said inside diameter of said collar;

said outer surface of said connecting element comprises angled portions, said angled portions forming a second shoulder; and said second shoulder of said connecting element is disposed against said end surface of said second end of said collar.

6. The shock absorber according to claim 5 wherein:

said angled portions of said second shoulder of said connecting element comprise an axial surface;

said end surface of said second end of said collar comprises an axial surface;

said axial surface of said angled portions of said second shoulder of said connecting element centers said connecting element against said axial surface of said end surface of said second end of said collar.

7. The shock absorber according to claim 6, wherein:

said cylinder comprises:

an outer cylinder;

an inner cylinder;

said inner cylinder is disposed substantially concentrically within said outer cylinder;

said outer cylinder and said inner cylinder define said equalization chamber, said equalization chamber being disposed between said outer cylinder and said inner cylinder;

a working cylinder disposed substantially concentrically within said inner cylinder, said inner cylinder and said working cylinder defining said bypass channel;

said bypass channel is disposed between said inner cylinder and said working cylinder;

said outer cylinder comprises a first end and a second end;

said piston rod extends out of said first end of said outer cylinder;

said second end of said outer cylinder comprises base valve means;

said valve means is connected laterally to said outer cylinder;

said first aperture means is disposed for permitting flow of fluid from said first aperture means to said bypass channel;

said second aperture means is disposed for permitting flow of fluid from said second aperture means to said equalization chamber;

said valve means comprises a second collar;

said second collar is connected to said first aperture means; and said valve means comprises an electromagnetic valve.

8. A method of manufacturing a shock absorber for a motor vehicle comprising the steps of:

providing a cylinder having a longitudinal axis;

providing a piston rod for sealingly projecting into said cylinder, and for being axially displaceable with respect to said cylinder;

providing a piston for being attached to said piston rod, and for being slidably disposed within said cylinder to sealingly divide said chamber into first and second chambers;

providing means for permitting fluid communication between said first and second chambers;

said step of providing said means for permitting fluid communication further comprising providing valve means having first aperture means and second aperture means;

said step of providing said valve means further comprising:

providing a collar having a longitudinal axis, said collar having an inner surface and an outer surface;

providing a connecting element having an inner surface and an outer surface;

providing a valve for permitting flow of fluid in said collar; and providing means for connecting said connecting element to said collar;

said method further comprising the steps of:

configuring said cylinder to define a chamber therein, said chamber containing a damping fluid;

disposing said piston rod to sealingly project into said cylinder, and disposing said piston rod to be axially displaceable with respect to said cylinder;

attaching said piston to said piston rod;

slidably disposing said piston within said cylinder to sealingly divide said chamber into first and second chambers;

disposing said collar on said cylinder to project from said cylinder;

disposing said longitudinal axis of said cylinder such that said longitudinal axis of said cylinder is substantially transverse to said longitudinal axis of said collar;

forming said collar on said cylinder;

disposing said outer surface of said connecting element within said inner surface of said collar;

said connecting element comprising a first end and a second end, said second end being disposed away from said cylinder;

sliding said connecting element into said collar until said second end of said connecting element is a predetermined distance from said longitudinal axis of said cylinder;

welding said connecting element to said collar;

connecting said valve to said collar by said connecting element; and disposing at least one of: said first aperture means and said second aperture means in contact with said collar for permitting flow of fluid between one of said first and second aperture means and said collar.

9. The method according to claim 8 further comprising:

said outer surface of said connecting element comprising:

a first portion extending away from said weld in a direction substantially away from said cylinder;

a second portion extending from said weld towards said cylinder;

said first portion having a diameter said diameter being defined substantially perpendicular to said longitudinal axis of said collar;

said second portion having a diameter, said diameter being defined substantially perpendicular to said longitudinal axis of said collar;

said diameters of said first and second portions of said connecting elements being substantially equal;

configuring said cylinder to comprise an equalization chamber and disposing said equalization chamber in said cylinder;

configuring said equalization chamber to comprise means for permitting flow of said fluid between said equalization chamber and one of said first and second chambers; and configuring said means for permitting flow of said fluid between said equalization chamber and one of: said first chamber and said second chamber to comprise at least said valve and a bypass channel.

10. The method according to claim 9 further comprising:

configuring said connecting element to have a circular and cylindrical shape;

disposing a first shoulder at least partially within said connecting element;

disposing said valve within said first shoulder of said connecting element;

configuring said connecting element and said valve to comprise a prefabricated part;

disposing said prefabricated part in said collar as a unit; and welding said unit comprising said connecting element and said valve to said collar.

11. The method according to claim 10 further comprising:

providing said cylinder with a wall portion;

at least one of: extruding, pressing, extracting, forging, and stamping, said wall portion of said cylinder to form said collar;

configuring said collar to comprise a circular and cylindrical shape;

disposing said connecting element at least partially within said collar;

configuring said collar to comprise an end surface;

configuring said collar to comprise said inner surface;

configuring said connecting element to comprise said outer surface;

disposing said collar end surface and said collar inner surface to at least partially abut said outer surface of said connecting element;

disposing a portion of said outer surface of said connecting element substantially adjacent said collar end surface; and connecting said portion of said connecting element and said collar end surface with said at least one weld seam.

12. The method according to claim 8 further comprising:

said outer surface of said connecting element comprising a first portion disposed immediately adjacent said weld;

a second portion extending from said first portion of said connecting element towards said cylinder;

said first portion of said connecting element having a diameter, said diameter being defined substantially perpendicular to said longitudinal axis of said collar;

said second portion of said connecting element having a diameter said diameter being disposed substantially perpendicular to said longitudinal axis of said collar;

said diameters of said first and second portions of said connecting element being substantially equal;

configuring each of said inner surface and said outer surface of said collar to be substantially cylindrical;

configuring each of said inner surface and said outer surface of said connecting element to be substantially cylindrical;

disposing a portion of said inner surface of said collar about said outer surface of said connecting element;

configuring said inner surface of said collar for receiving and supporting said connecting element;

disposing a collar end surface away from said cylinder;

disposing said collar end surface in a plane tangential to said portion of said cylinder outer surface;

defining a longitudinal axis of the connecting element;

disposing said second end of said connecting element at a substantial axial distance from said first end of said connecting element;

disposing said first end of said connecting element substantially adjacent said collar;

configuring said connecting element to comprise a substantial portion between said first end and said second end of said connecting element;

configuring said collar to comprise an inside diameter;

configuring said substantial portion of said connecting element to comprise an outer diameter;

configuring said outer diameter of said substantial portion of said connecting element to be substantially equal to said diameter of said inside diameter of said collar;

configuring said connecting element outer diameter to comprise a second shoulder;

disposing said second shoulder against said end surface of said collar;

configuring said second shoulder of said connecting element to comprise an axial surface;

configuring said collar end surface to comprise an axial surface; and disposing said axial surface of said second shoulder against said axial surface of said collar end surface.

13. The method according to claim 12 further comprising:

configuring said cylinder to comprise an outer cylinder;

disposing an inner cylinder within said outer cylinder;

disposing said inner cylinder substantially concentrically within said outer cylinder;

disposing an equalization chamber substantially between said outer cylinder and said inner cylinder;

disposing a working cylinder substantially concentrically within said inner cylinder;

disposing a bypass channel between said inner cylinder and said working cylinder;

configuring said outer cylinder to comprise a first end and a second end;

disposing said piston rod to extend out of said first end of said outer cylinder;

providing base valve means;

disposing said base valve means at said second end of said outer cylinder;

connecting said valve means laterally to said outer cylinder;

disposing said first aperture means for permitting flow of fluid from said first aperture means to said bypass channel;

disposing said second aperture means for permitting flow of fluid from said second aperture means to said equalization chamber;

configuring said valve means to comprise a second collar;

connecting said second collar to said first aperture means; and configuring said valve means to comprise an electromagnetic valve.

14. A shock absorber comprising:

a cylinder;

said cylinder having a longitudinal axis;

said shock absorber comprising an outer surface;

said cylinder comprising a substantial portion of the outer surface of said shock absorber;

said cylinder defining a chamber therein, said chamber containing a damping fluid;

a piston rod sealingly projecting into said cylinder and being axially displaceable with respect to said cylinder;

a piston being attached to said piston rod, said piston being slidably disposed within said cylinder to sealingly divide said chamber into first and second chambers;

means for permitting fluid communication between said first and second chambers;

said means for permitting fluid communication comprising valve means, said valve means having first aperture means and second aperture means, said valve means being configured for permitting fluid flow between said first aperture means and said second aperture means;

said valve means comprising:
 a valve;
 a collar;
 said collar having a longitudinal axis;
 said collar being disposed on, and projecting from, said cylinder;
 said longitudinal axis of said cylinder being disposed substantially transverse to said longitudinal axis of said collar;
 said collar having an inner surface and an outer surface;
 said collar having a first end and a second end;
 said first end of said collar being disposed adjacent said cylinder;
 each of said inner surface and said outer surface of said collar being substantially cylindrical;
 said inner surface of said collar being disposed at least partially within said outer surface of said collar;
 a connecting element;
 said connecting element having an inner surface and an outer surface;
 each of said inner surface and said outer surface of said connecting element being substantially cylindrical;
 a portion of said inner surface of said collar being disposed about said outer surface of said connecting element;
 said inner surface of said collar for receiving and supporting said connecting element;
 said outer surface of said connecting element being in contact with said inner surface of said collar;
 said valve being connected to said collar by said connecting element;
 at least one of said first aperture means and said second aperture means being disposed in contact with said collar for permitting flow of fluid between one of said first and second aperture means and said collar;
 said valve for controlling flow of fluid in said collar;
 a weld for connecting said connecting element to said collar;
 said weld being disposed at said second end of said collar;
 said outer surface of said connecting element comprising:
  a first portion extending from said weld in a direction substantially away from said cylinder;
  a second portion extending from said weld towards said cylinder;
 said first portion having a diameter, said diameter being defined substantially perpendicular to said longitudinal axis of said collar;
 said second portion having a diameter, said diameter being defined substantially perpendicular to said longitudinal axis of said collar; and
 said diameters of said first and second portions of said connecting elements being essentially equal.

15. The shock absorber according to claim 14, wherein:

said cylinder comprises an equalization chamber, said equalization chamber being disposed in said cylinder;

said equalization chamber comprises means for permitting flow of fluid between said equalization chamber and one of said first and second chambers; and said means for permitting flow of fluid between said equalization chamber and said at least one chamber comprises: at least said valve and a bypass channel.

16. The shock absorber according to claim 15, wherein:

said connecting element comprises a circular and cylindrical shape;

said inner surface of said connecting element defines an inner area of said connecting element;

said inner area of said connecting element comprises an aperture;

said connecting element comprises a first shoulder;

said first shoulder being disposed at least partially within said connecting element aperture;

said first shoulder of said connecting element for connecting said valve to said collar;

said connecting element and said valve together comprise a prefabricated part, said prefabricated part for being disposed in said collar as a unit during manufacture; and said unit comprises said connecting element and said valve being welded as a prefabricated part to said collar.

17. The shock absorber according to claim 16, wherein:

said cylinder of said shock absorber comprises an outer wall;

said outer wall of said cylinder comprises a portion;

said outer wall portion of said cylinder comprises at least one of: an extrusion, a pressing, an extraction, a forging, and a stamping;

said outer wall portion of said cylinder comprises said collar;

said collar is an extension of said outer wall portion of said cylinder;

said collar is substantially in the form of a circular and cylindrical shape;

said inner surface of said collar defines an inner area of said collar;

said inner area of said collar comprises an aperture, said collar aperture for receiving said connecting element;

said aperture of said inner area of said collar abuts each of said first and second aperture means;

said second end of said collar is disposed opposite said first end and extends away from said cylinder;

said second end of said collar comprises an end surface;

said end surface of said second end of said collar connects said inner and outer surfaces of said collar to one another; and said end surface of said second end of said collar and said inner surface of said collar at least partially abut said outer surface of said connecting element;

a portion of said outer surface of said connecting element is disposed substantially adjacent to and in contact with said end surface of said second end of said collar;

said end surface of said second end of said collar and said portion of said outer surface of said connecting element comprise said at least one weld seam;

said at least one weld seam connects said connecting element to said collar;

said end surface of said second end of said collar is disposed away from said cylinder; and said end surface of said second end of said collar defines a plane, said plane being disposed tangentially with respect to a portion of said outer wall of said cylinder.

18. The shock absorber according to claim 17, wherein:

said connecting element has a longitudinal axis;

said longitudinal axis of said connecting element defines an axial direction parallel to the longitudinal axis of said collar;

said connecting element comprises a first end and a second end;

said second end of said connecting element is disposed at a substantial axial distance from said first end of said connecting element;

said first end of said connecting element is disposed substantially adjacent said collar;

said connecting element comprises a portion disposed between said first end and said second end of said connecting element;

said portion of said connecting element has a length parallel to the longitudinal axis of said connecting element;

said aperture of said collar has an inside diameter;

said connecting element has a portion, said portion of said connecting element has an outside diameter;

said outside diameter of said portion of said connecting element is disposed perpendicular to said longitudinal axis of said collar;

said outside diameter of said portion of said connecting element is substantially continuous along at least a portion of said longitudinal axis of said collar;

said outside diameter of said portion of said connecting element is substantially equal to said inside diameter of said collar;

said outer surface of said connecting element comprises angled portions, said angled portions forming a second shoulder; and said second shoulder of said connecting element is disposed against said end surface of said second end of said collar.

19. The shock absorber according to claim 18 wherein:

said angled portions of said second shoulder of said connecting element comprise an axial surface;

said end surface of said second end of said collar comprises an axial surface; and said axial surface of said angled portions of said second shoulder of said connecting element centers said connecting element against said axial surface of said end surface of said second end of said collar.

20. The shock absorber according to claim 19, wherein:

said cylinder comprises:
an outer cylinder;
an inner cylinder;
said inner cylinder is disposed substantially concentrically within said outer cylinder;
said outer cylinder and said inner cylinder define said equalization chamber, said equalization chamber being disposed between said outer cylinder and said inner cylinder;
a working cylinder disposed substantially concentrically within said inner cylinder, said inner cylinder and said working cylinder defining said bypass channel;
said bypass channel is disposed between said inner cylinder and said working cylinder;
said outer cylinder comprises a first end and a second end;

said piston rod extends out of said first end of said outer cylinder;

said second end of said outer cylinder comprises base valve means;

said valve means is connected laterally to said outer cylinder;

said first aperture means is disposed for permitting flow of fluid from said first aperture means to said bypass channel;

said second aperture means is disposed for permitting flow of fluid from said second aperture means to said equalization chamber;

said valve means comprises a second collar;

said second collar is connected to said first aperture means; and said valve means comprises an electromagnetic valve.

* * * * *

UNITED STATES PATENT AND TRADEMARK OFFICE
CERTIFICATE OF CORRECTION

PATENT NO. : 5,685,400
DATED : November 11, 1997
INVENTOR(S) : Günther HANDKE, Klaus BEYFUSS, Carlos PRUDENTE, Henning RITTSTIEG and Rolf WENGENROTH It is certified that error appears in the above-identified patent and that said Letters Patent is hereby corrected as shown below:

In column 12, line 49, Claim 12, after 'collar;' insert the following: --disposing a first shoulder at least partially within said connecting element;--.

Signed and Sealed this

Fifteenth Day of September, 1998

Attest:

BRUCE LEHMAN

Attesting Officer

Commissioner of Patents and Trademarks